May 4, 1971  B. K. BIGLAND  3,577,488

MANUFACTURE OF PLASTIC TUBULAR FILM

Filed July 15, 1969  4 Sheets-Sheet 4

INVENTOR:
Bernard K. Bigland,
BY
Bierman & Bierman, ATTORNEYS.

United States Patent Office 3,577,488
Patented May 4, 1971

3,577,488
MANUFACTURE OF PLASTIC TUBULAR FILM
Bernard K. Bigland, Radcliffe, Manchester, England, assignor to General Engineering Company (Radcliffe) Limited
Continuation-in-part of application Ser. No. 557,581, June 14, 1966. This application July 15, 1969, Ser. No. 841,871
Claims priority, application Great Britain, June 15, 1965, 25,190/65
Int. Cl. B29d 7/24
U.S. Cl. 264—95                                    6 Claims

ABSTRACT OF THE DISCLOSURE

A method of forming an extruded tube of plastic material comprising extruding the material in a semi-molten state as a tubular film, having a wall of greater thickness than that of the finished tube, locating a first former within the tube near the extrusion point, passing the film over the face of the former in close proximity thereto, locating a second former at a point more remote from the extrusion point, passing the film over the face of the second former in close proximity thereto, directing a high velocity stream of air against the inner face of the film from below the first former and creating a further high velocity stream of air against the inner face of the film and between it and the second former, extracting air from the space between the two formers to maintain the air pressure in said space between the formers at or below atmospheric pressure, said streams of air moving at a velocity sufficient to prevent actual contact between the film and the formers, and arranging that the freeze zone of the film is in the region of maximum diameter of the second former and preferably between the position of maximum diameter and the downstream end thereof. The diameter of the tube being extruded can be varied by varying the diameter of the second former. In order to obtain still greater speeds of extrusion external cooling can be applied.

This application is a continuation-in-part of my copending application Ser. No. 557,581 filed June 14, 1966, now abandoned, and entitled "Improvements in or Relating to the Manufacture of Plastic Tubular Film."

This invention relates to the manufacture of plastic tubular films such as is now extensively used for packaging and made from polyethylene, polystyrene or polyvinyl chloride and like thermoplastic materials. More particularly, though not exclusively, the invention relates to the production of a tubular extrusion having a thin wall of uniform dimensions by the expansion of the diameter of the tube over a former after it leaves the extrusion die and before it reaches the nip roll draw-off assembly. The invention is particularly, but not exclusively, applicable to the method and apparatus wherein the plastic tube is expanded after it leaves the extruder die by pulling it over an air cushion maintained on the peripheral surface of a former.

A known system of manufacture of such film consists in the use of a plastic extrusion machine to feed material to a die head which may be arranged to deliver the film as a tube, either horizontally or vertically (up or down). Such extruded tube is thicker than the intended film thickness and the next stage is to pass the tube through the nip of feed rollers at a suitable distance from the die head and to inflate the length of tube by air pressure within the closed volume between the die head and nip rollers to produce an expansion of diameter of the tube and bring the tube wall to the required film thickness.

Such process involves several problems and in particular as regards temperature and control of the "blown" tube size, both of which are factors determining the accuracy of film gauge and speed of production. The extruded tube must be hot as it emerges from the die while it must thereafter be cooled to condition the plastic for blowing and to control the resultant stretch and its uniformity.

In fact, the speed at which "blown" film can be produced is largely determined by the initial temperature of extrusion and the available effective degree of cooling. Furthermore, the quality of film produced, particularly as regards clarity, is a direct function of the temperature which should be as high as possible, while the blown length is determined by the effectiveness of cooling, and control of diameter becomes increasingly difficult as such length is increased. Also, problems arise from distortion of the blown shape if the force of external air cooling is unduly increased. All the above problems result in limiting production speed or deterioration in film quality.

In another method of production the extruded tube is expanded over a former of known fixed diameter but such system has necessitated the use of liquid as a coolant and lubricant to prevent sticking to the former and the use of such liquids in contact with the film brings its own special problems, since they are difficult to remove from the film and may destroy the quality of the film through spot cooling.

Still another prior-art process provides a plate in the bubble dividing it into two pressure zones. The film is stretched to the desired diameter in the high-pressure zone (the one adjacent to the extruder) and passes over the plate and is then rolled up. The freeze zone of the plastic tubing is located below the former as the diameter is set prior to passing thereover. This process localizes the high-pressure volume and permits operation at higher speeds than heretofore known. However, it presents most of the same disadvantages as the old methods of extrusion in that there is poor control of thickness due to the inevitable pressure variations. Furthermore, it is difficult to vary the size of the diameter of the tubing being extruded as it is necessary to adjust and rebalance the volume of air contained within the extrusion bubble. The entire process is very tricky since the volume of air entering the bubble must exactly equal that leaving the bubble. If this is not so, the bubble will begin to expand (if less air leaves than enters) or contract (if more air leaves than enters). In the latter case, it will very soon touch the plate and the film will break or be marred. In the former case, the volume will build up and the bubble will increase in size thus enlarging the diameter beyond that intended. Even slight variations in the input-output relationship will of course cause corresponding variations in the diameter of the finished tube. Obviously, if this condition is permitted to continue the bubble will burst.

A further factor which affects the rate of production of tubular film and which is applicable to some at least of the prior art processes lies in the fact that the air stream used at the said former, to act as a cushion and cooling means for the tube, results also in the production of a volume of relatively stagnant and heated air above the former in the interior of the tube between the said former and the nip roll draw-off assembly, which length of tube is regarded as a final cooling zone. Such volume of hot air can only operate to retard the rate of cooling of the tube and thus result in either a reduction in production rate or the need to provide a relatively long cooling zone.

The invention is based upon the appreciation that the aforementioned difficulties can be overcome or at least substantially reduced and furthermore that it is possible to restrict the effect of the heated air to a small region of the tube and thus enable production rate to be increased and a shortened final cooling zone to be provided immediately above the position at which the final character of the tube is determined so that more rapid final cooling of the plastic tube may be obtained.

The invention comprises the method of manufacture of tubular plastic film by the known method of stretching the extruded tube as it leaves the extruder by pulling it over an air cushion maintained on the peripheral surface of a former, including the further step of providing a second former after and spaced away from the first, creating an air cushion over said second former and extracting the air from both air cushions from a position between the two formers.

The invention also includes apparatus for the manufacture of tubular plastic film by extrusion comprising a toroidal-shaped former, means for introducing cool air within the extruded tube on one side of said former so as to create a flowing air cushion between the former and the extruded tube, a mechanical draw-off means for pulling said tube over said air cushion to expand and stretch it, characterised by a second toroidal-shaped former spaced away from the first, means for introducing cool air into the tube so as to create a flowing air cushion on the surface of said second former and exhaust means for extracting air disposed within the space between the two formers, said extraction being carried out at such a rate that the pressure in said space does not exceed atmospheric pressure.

Figure 1:
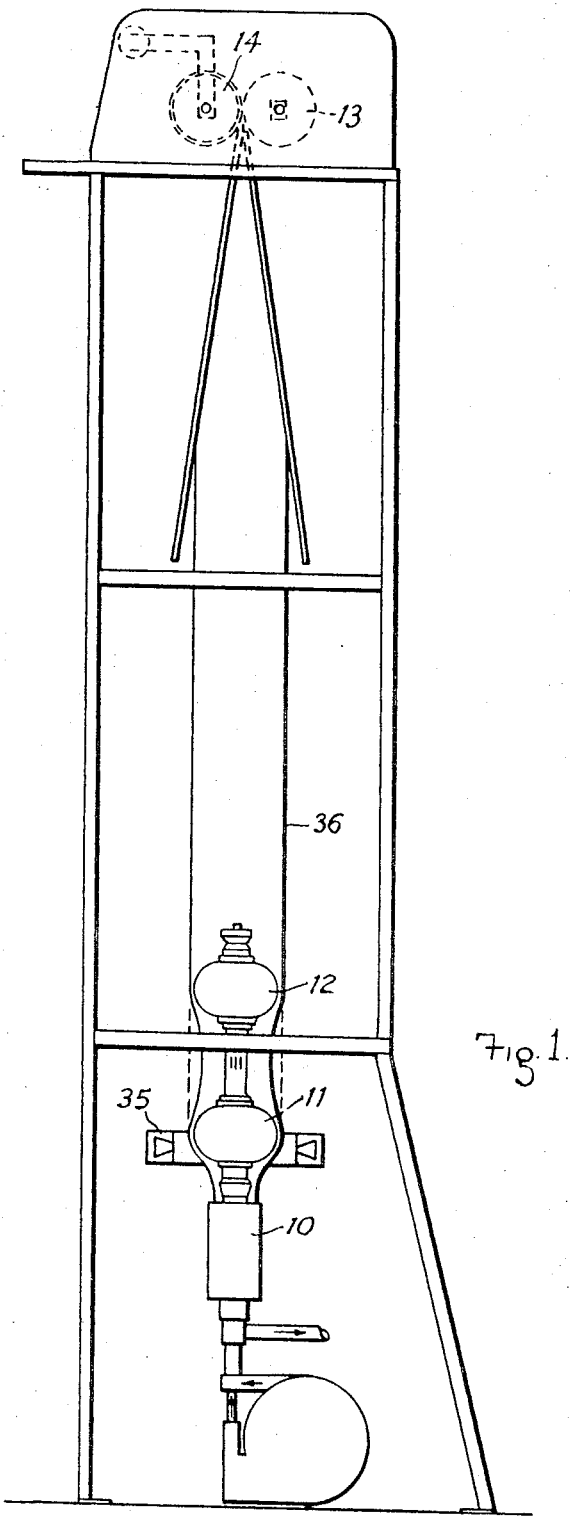
FIG. 1 is a diagrammatic side elevation of one example of a tubular plastic film making apparatus made in accordance with the present invention.

As shown in FIG. 1 the apparatus comprises an extrusion die 10 which is fed with plastic material from a continuous feed plastic extrusion machine (not shown).

Figure 2:
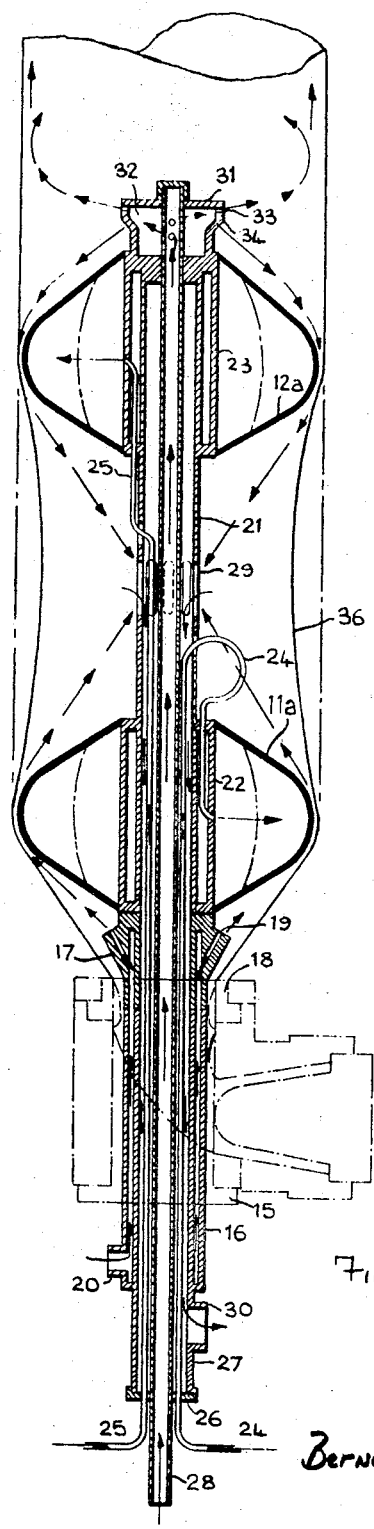
FIG. 2 is an enlarged detail view of part of the apparatus shown in FIG. 1.

Above the die, which is intended for making a tube of 14 inches diameter, after expansion, are inflatable formers 11 and 12 supported on a fabricated column through which are air passages shown in more detail in FIG. 2. The two formers are approximately two feet apart and above the top former are nip rollers 13, 14, forming part of a conventional take-off assembly.

As shown in FIG. 2 supporting and passing upwardly through a die mandrel 15 is a cylindrical tube 16. The cylindrical tube 16, connects with a base 17 of the upper part of the fabricated column which base in turn locates within the die ring 18. The base 17 is conical and provided with both radially and axially spaced upwardly inclined perforations 19. The conical base 17 has its lower end, via the cylindrical tube 16, connected by a suitable air inlet 20 to a fan or compressor (not shown). The main body of the fabricated column 21 then locates upon the conical base 17. Mounted onto the main body of the fabricated column 21 are two cylindrical structures 22, 23 having their internal diameters greater than that of the said fabricated column 21 and sealed at each end. These cylindrical structures each support an inflatable toroidal member 11a and 12a constituting the formers 11 and 12 (FIG. 1). Pipes 24 and 25 pass from each toroidal member downwardly through the main body of the fabricated column 21 and the die mandrel 15 through a plug 26 adjacent to tubes 27 and 28. The lower end of these pipes 24 and 25 are connected to a supply of compressed air via suitable valve control means (not shown). Situated between the two cylindrical structures 22 and 23 are a series of radially and axially spaced slots 29 which pass through the wall of the fabricated column 21 such that the connection to the annulus between the tube 27 or 21 and tube 28 allows air to be drawn through the slots 29 when a suitable exhaust system is connected at 30. Means may be provided for cooling the wall of the tube 27 which separates the cool inflow from the heated exhaust, as by cooling coils attached to the inner wall of the tube 27.

Located on the top of the main body of the fabricated column 21 is a cap 31 which forms a chamber 32 leaving an annular exit 33 and formed with radially and axially spaced downwardly inclined perforations 34. The chamber is connected by means of the tube 28 which passes through the main body of the fabricated column 21 and the die mandrel 15 and is connected to a fan or compressor (not shown). The diameter of the tube 28, being smaller than that of the tube 27, which is in turn smaller than the tube 16 thus provides between them annular passages for the flow of air, as described later. An air cooling ring, generally indicated at 35 (FIG. 1) is positioned outside and in the area of the first toroidal member 11 and is spaced somewhat therefrom, with its annular outlet directed thereto (see FIG. 1).

FIG. 1 shows the apparatus in use extruding a thin walled cylindrical plastic tube 36 which passes between the draw-off nip rollers 13 and 14.

The purpose and function of the various integers of the apparatus will be apparent from the following description of the operation of the machine.

On starting the machine the supplies of air to the cooling ring 35 inlet 20 and tube 28, are shut off and pipes 24 and 25 are shut off so that the toroidal members 11a and 12a are in the deflated state indicated by dotted lines in FIG. 2. The outlet 30 is also closed. The extrusion machine feed is started, and a comparatively thick walled plastic tube of greater diameter than the diameter of the deflated toroidal members is extruded from the die head 18. The plastic tube is passed upwardly between the air ring 35 and the toroidal member 11a and over the upper toroidal member 12a and thereafter fused to a pre-extruded length of film which passes through the draw-off nip roll assembly 13, 14 to the usual take up mechanism. The inlet to the tube 28 is then opened to allow air to pass through this tube and up into the upper chamber 32 and out through the annulus 33 and perforations 34. At the same time the inlet 20 is opened to allow air to pass up the annulus between tubes 16 and 27, and then out through the perforations 19. The direction of the air flow being generally as shown by the arrows in FIG. 2.

At this stage the apparatus is ready for starting and a controlled quantity of air is admitted into each of the pipes 24 and 25 so causing the toroidal members 11a and 12a to inflate, thus, when extrusion is started, increasing the diameter of the on-coming soft plastic tube 36, with a consequent thinning of the walls. Following this the air supply to the cooling ring 35 (FIG. 1) can be brought into operation, whilst at the same time the exhaust system to connection 30 is opened so removing hot air from within the extruded tube between the toroidal members, the direction of the exhaust air flows being shown in FIG. 2. The extruded tube then flows over the expanded toroidal members 11a and 12a floating on a cushion of air supplied from each of the perforations 19 and 34. In the drawings an exaggerated gap is shown to make its existence clear as the cushion itself is normally only of the order of thousandths of an inch. At this stage the supply of air to the cooling ring 35 may now be increased to emit large quantities of cooling air without distorting the plastic tube 36 since the latter is inwardly supported by the two said air cushions on the toroidal member. The air flows to the perforation 19 and 34 and the annulus 33 can also be increased, together with an increase in the capacity of the exhaust. This results in greater efficiency in the internal and external cooling of the extruded tube than has hitherto been possible and as a consequence the plastic material may be extruded at substantially higher temperatures, which allows greater speed of production, and a better quality product to be realised. Furthermore, very rigid control can be maintained during production as the diameter of the plastic tube 36 may be readily corrected by admitting or releasing a small quantity of air from either or each of the toroidal members as may be necessary.

On stopping the machine an obviously similar sequence of operations is performed substantially in reverse.

Figure 3:
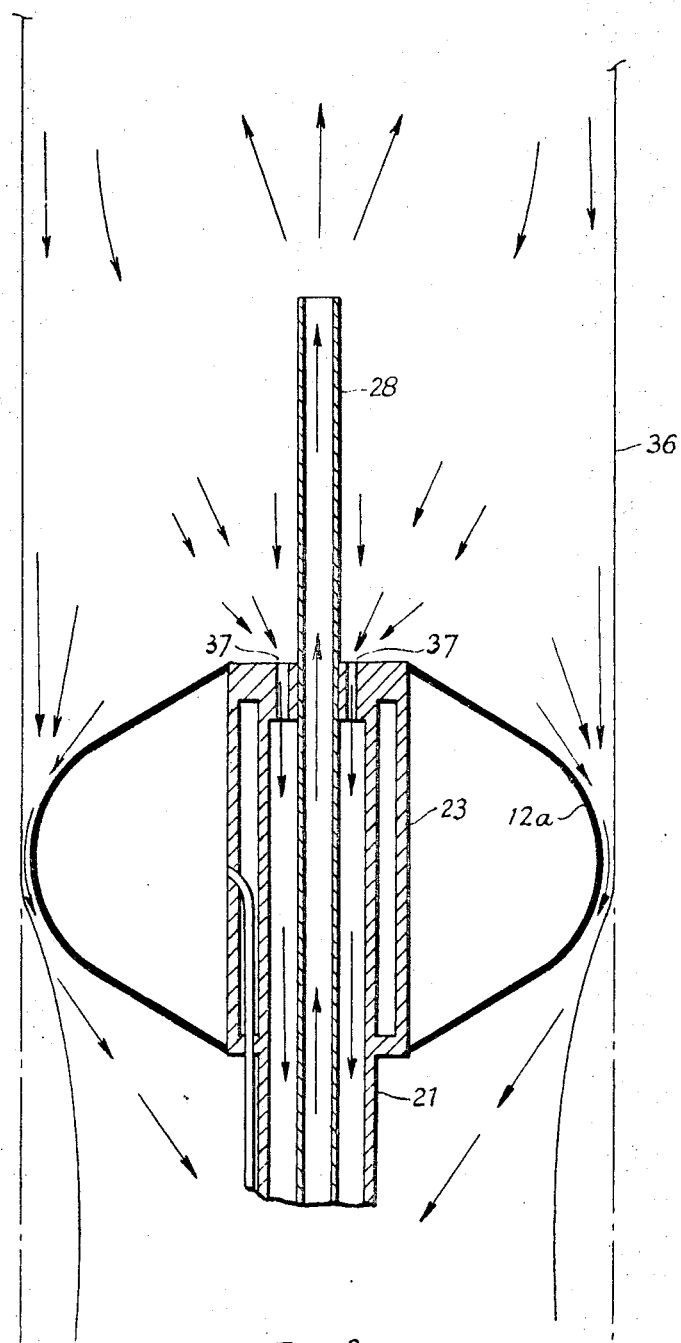
FIG. 3 is a view similar to FIG. 2 showing a modification of the upper part thereof.

As shown in FIG. 3 the upper end of the fabricated column is modified, the chambers 32 being omitted and the tube 28 extened some 12 inches and left open-ended so as to direct air into the volume of the extruded tube above the upper toroidal member 12a. Perforations 37 are also provided in the upper end of the fabricated column, opening into the exhaust passage between the tubes 21 and 28.

In operation, air emitted at the upper end of the tube 28 causes more rapid removal of air from the upper end of the extruded tube above the second toroidal member 12a where previously it tended to remain static. This introduction and part extraction of air from above the upper former enables increased air flow to be effected without increasing the pressure in said upper zone such as could cause further undesirable expansion of the extruded tube. Some of the air provides the air cushion by passing as before downwardly over the toroidal member 12a to reach the exhaust holes 29, while the remainder of the air passes direct through the holes 37 to the exhaust connection 30.

During the operation of the apparatus as shown in FIGS. 1 and 2 or 3 the rate of extraction of air is controlled, to ensure that the pressure between the formers is at atmospheric pressure or below. The pressure which exists between the two formers must be maintained at atmospheric pressure or below in order to create the air cushion over the second former. If the pressure between the two formers is allowed to exceed atmospheric pressure, a hoop or circumferential stress will be set up in the film. Due to the semi-plastic state of the film, the stress created will be such that the cushion of air on the periphery of the second former will be destroyed. If the air cushion is so destroyed, the layflat width, that is the width of the flattened tube created by passing the film through the nip of the rollers 13 and 14, is no longer controlled by the second former. In addition the loss of the air cushion at the second former, results in the ability of relatively hot air to flow over the whole length of the film tube and thus the rate of cooling of the film is reduced and the situation can arise in which, when the tube is flattened at the nip of the rollers, the two thicknesses of film so formed, adhere to each other by virtue of the residual heat contained in the film and the consequent plasticity of the inner face of the film.

It will be appreciated that the scope of the invention is in no way limited by the above example, many variations being possible. For example the toroidal members 11a and 12a could be inflated by liquid which could circulate therein to give added cooling. Also it would be possible to use a mechanically expandable former in place of the inflatable toroidal member.

Figure 4:
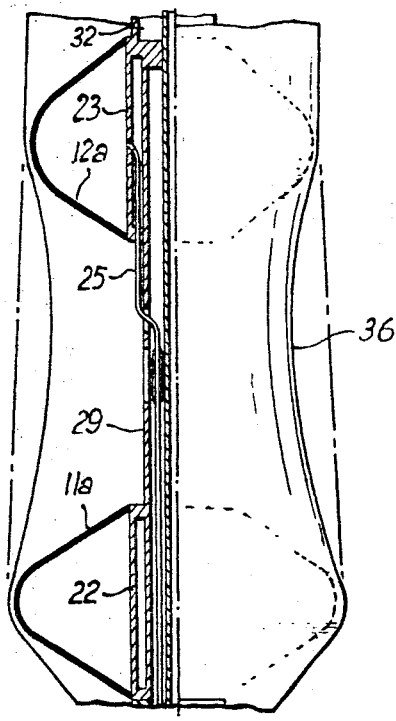
FIGS. 4 and 5 show part of the apparatus of FIGS. 1 to 3 as it can be used in alternative ways to that shown in FIGS. 1 to 3.
Figure 5:
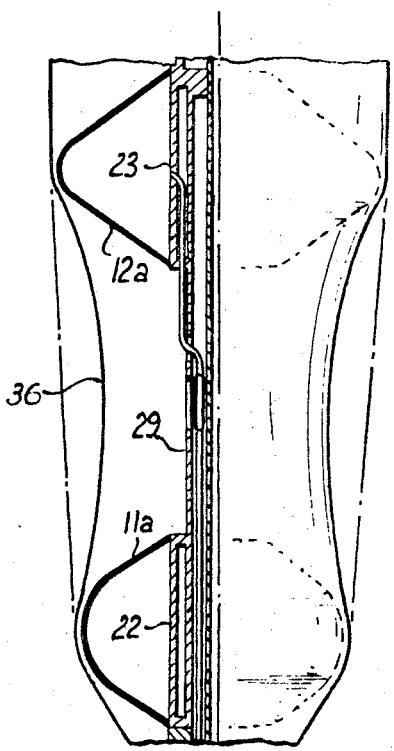

It is also possible, as shown in FIGS. 4 and 5 to produce a tubular film by having the lower former 11a larger than the upper former 12a (as shown in FIG. 4) or vice versa (as shown in FIG. 5).

The broken line between the formers as shown in FIG. 1; and the chain line as shown in FIGS. 2 to 5 indicates the position that would be occupied by the film if the pressure of air between the formers is allowed to reach atmospheric and this represents the limiting position that can be taken up by the film if the process is to be carried out efficiently and without loss of the air cushion at the upper former.

In practising the invention the freeze zone of the film is preferably located between the position of maximum diameter of the upper former and the downstream end thereof. The term "freeze zone" is used in this specification to mean the zone in which crystallization of the original amorphous plastic commences, we use the term "freeze zone" as opposed to the term "freeze line" as known in the art since the change of state does not occur at a sharply defined position in the film. The freeze zone can be visually detected due to the fact that a decrease in clarity or clouding of the film takes place. The zone is irregular due to corresponding fluctuations in the process conditions. When the film leaves the freeze zone it is dimensionally stable. Since freezing takes place in a zone rather than at a defined line it is not absolutely essential that the whole of this zone is at the downstream side of the position of maximum diameter of the upper former.

It should be appreciated that the whole apparatus can be modified so as to extrude the thin walled plastic tube downwardly or horizontally.

We claim:

1. A method of manufacture of tubular plastic film comprising:
    extruding a tubular film of molten thermoplastic material having walls of greater thickness than the required finished wall thickness;
    stretching the extruded tubular film by passing same over a first former while providing an air cushion on the outer surface of said first former, said air cushion being created by supplying air to the interior of the film on the side of the first former closest to the die such that the air passes over said first former to the opposite side of said first former;
    passing the thus expanded, extruded tubular film over a second former while providing an air cushion on the outer surface of said second former, said air cushion being created by supplying air to the interior of the film on the side of the former farthest from the die such that the air passes over said second former to the opposite side of said second former and into the space between said first and second formers;
    and exhausting the air from both air cushions from between the two formers at a rate such that the pressure in the space between the two formers does not exceed atmospheric pressure.

2. The method according to claim 1 including the further step of providing controlled exhaust means beyond the second former and introducing sufficient air beyond the second former to provide not only the said air cushion for such second former but also air circulation within the extruded tube beyond such second former.

3. The method according to claim 1 including the step of introducing the air above the second former at a point well above the same and directed towards the further end of the extruded tube.

4. Apparatus for the manufacture of tubular plastic film by extrusion comprising a toroidal-shaped former, means for introducing cool air within the extruded tube on one side of said former so as to create a flowing air cushion between the former and the extruded tube, a mechanical draw-off means for pulling said tube over said cushion to expand and stretch it, characterised by a second toroidal-shaped former spaced away from the first, means for introducing cool air into the tube so as to create a flowing air cushion on the surface of said second former and exhaust means for extracting air disposed within the space between the two formers, said exhaust means for extracting air being a common exhaust located between the two formers and including a separate cool air supply for each air cushion at their other sides, said extraction being carried out at such a rate that the pressure in said space does not exceed atmospheric pressure.

5. Apparatus according to claim 4 further characterised by an extension for the cool air supply for the second former arranged to direct air into the far end of the tube and an exhaust for a controlled portion of said air on that side of the second former.

6. Apparatus according to claim 4 further characterised in that the formers are inflatable.

No references cited.

ROBERT F. WHITE, Primary Examiner

T. J. CARVIS, Assistant Examiner

U.S. Cl. X.R.

18—14